United States Patent
Malek et al.

(10) Patent No.: US 11,001,361 B2
(45) Date of Patent: May 11, 2021

(54) BUFFER ZONE FOR INTERIOR AIRCRAFT FEATURES

(71) Applicant: Bombardier Inc., Dorval (CA)

(72) Inventors: Bruce Malek, Senneville (CA); Stefan Holowka, Montreal (CA); Nikolas Beaudin, Montreal (CA)

(73) Assignee: BOMBARDIER INC., Dorval (CA)

( * ) Notice: Subject to any disclaimer, the term of this patent is extended or adjusted under 35 U.S.C. 154(b) by 775 days.

(21) Appl. No.: 15/306,241

(22) PCT Filed: Apr. 20, 2015

(86) PCT No.: PCT/IB2015/052876
§ 371 (c)(1),
(2) Date: Oct. 24, 2016

(87) PCT Pub. No.: WO2015/162542
PCT Pub. Date: Oct. 29, 2015

(65) Prior Publication Data
US 2017/0043855 A1    Feb. 16, 2017

Related U.S. Application Data

(60) Provisional application No. 61/984,631, filed on Apr. 25, 2014.

(51) Int. Cl.
*B64C 1/06* (2006.01)
*B64D 11/00* (2006.01)
(Continued)

(52) U.S. Cl.
CPC ............... *B64C 1/066* (2013.01); *B64C 1/10* (2013.01); *B64D 11/0023* (2013.01); *B64F 5/10* (2017.01); *B64D 2011/0046* (2013.01)

(58) Field of Classification Search
CPC .. B64C 1/066; B64C 1/10; B64F 5/10; B64D 11/0023; B64D 2011/0046; B61D 17/18
See application file for complete search history.

(56) References Cited

U.S. PATENT DOCUMENTS 2,396,039 A * 3/1946 Graves .................. B64D 11/00
                                                          244/118.1
4,050,208 A    9/1977 Pompei et al.
(Continued)

FOREIGN PATENT DOCUMENTS

CN    201633920 U    11/2010
CN    102300771 A    12/2011
(Continued)

OTHER PUBLICATIONS

The State Intellectual Property Office of the People's Republic of China, Notification of First Office Action dated Jun. 19, 2018 re: Application No. 201580022486.1.
(Continued)

*Primary Examiner* — Medhat Badawi
*Assistant Examiner* — Vicente Rodriguez
(74) *Attorney, Agent, or Firm* — Norton Rose Fulbright Canada LLP

(57) ABSTRACT

Several embodiments of buffer zones are provided that are contemplated to be disposed with respect to two or more adjacent elements on an aircraft. The buffer zones adjust for dynamic spacing between the elements to help control different gapping requirements between the elements installed in the aircraft. Embodiments include an aircraft interior panel configuration, an aircraft interior wall panel configuration, an adjustable width aircraft bulkhead, and an aircraft personal service unit.

5 Claims, 8 Drawing Sheets

(51) Int. Cl.
  *B64F 5/10* (2017.01)
  *B64C 1/10* (2006.01)

(56) References Cited

U.S. PATENT DOCUMENTS

| | | | | |
|---|---|---|---|---|
| 4,597,549 | A | * | 7/1986 | Ryan ........................ B64C 1/10 160/127 |
| 4,739,955 | A | * | 4/1988 | Aquino ................... B64C 1/403 160/88 |
| 4,741,542 | A | | 5/1988 | Kimerly |
| 6,430,884 | B1 | | 8/2002 | Shreiner et al. |
| 7,261,044 | B2 | * | 8/2007 | Creighton ................. B60P 3/20 105/355 |
| 8,430,362 | B2 | | 4/2013 | Graeber et al. |
| D688,618 | S | | 8/2013 | Bock et al. |
| 8,544,176 | B2 | | 10/2013 | Delort |
| 8,882,045 | B2 | * | 11/2014 | Roth ........................ B64C 1/00 244/131 |
| 9,623,914 | B2 | * | 4/2017 | Grosse-Plankermann ................... B62D 25/20 |
| 2002/0112817 | A1 | | 8/2002 | Nemchick et al. |
| 2005/0140098 | A1 | * | 6/2005 | Etling ....................... B64C 1/12 277/630 |
| 2005/0236523 | A1 | * | 10/2005 | Schwartz ................ B64C 1/066 244/119 |
| 2008/0282636 | A1 | * | 11/2008 | Roth ....................... B64C 1/066 52/506.01 |
| 2010/0264268 | A1 | * | 10/2010 | Schneider ............... B64C 1/066 244/118.5 |
| 2012/0024455 | A1 | | 2/2012 | De Mattia et al. |
| 2013/0287482 | A1 | | 10/2013 | Busch et al. |
| 2014/0079905 | A1 | * | 3/2014 | Frankenberger ........ B64C 1/066 428/131 |
| 2015/0090151 | A1 | * | 4/2015 | Biadatz .................. B61D 17/18 105/396 |

FOREIGN PATENT DOCUMENTS

| | | |
|---|---|---|
| EP | 1468907 A2 | 10/2004 |
| EP | 2457822 A1 | 5/2012 |
| WO | 2009124832 A2 | 10/2009 |
| WO | 2013185746 A2 | 12/2013 |

OTHER PUBLICATIONS

English translation of China patent document No. CN 102300771A dated Dec. 28, 2011, https://patents.google.com/patent/CN102300771A/en?oq=CN102300771A, accessed on Jul. 18, 2018.

PCT international Search Report and Written Opinion dated Sep. 13, 2016 re: International Application No. PCT/IB2015/052876.

English translation of Chinese patent document No. CN 201633920U dated Nov. 17, 2010; www63.orbit.com/ . . . .

English translation of International patent publication No. WO 2013185746 A2 dated Dec. 19, 2013; www.google.ca/patents . . . .

* cited by examiner

BUFFER ZONE FOR INTERIOR AIRCRAFT FEATURES

CROSS-REFERENCE TO RELATED APPLICATION(S)

This application is a national phase application under 35 U.S.C. 371 of International Patent Application No. PCT/IB2015/052876 filed on Apr. 20, 2015, which claims priority from U.S. Provisional Patent Application Ser. No. 61/984,631, filed on Apr. 25, 2014, the entire content of which is incorporated herein by reference.

FIELD OF THE INVENTION

The present invention concerns configurations for the interior architecture of an aircraft. More specifically, the present invention concerns a construction for two or more adjacent elements on an aircraft that adjust for dynamic spacing between the elements to help control different gapping requirements between the elements installed in the aircraft.

BACKGROUND

As known to those of skill in the art, an aircraft fuselage is subject to considerable expansion, contraction, bending, corkscrewing, and other flex forces during service (referred herein as "aircraft flexure" or "flexure").

The dynamic movement of various aspects of the fuselage and interior components with respect to one another (i.e., aircraft flexure) introduces a changing environment that makes very difficult the close tolerance installation of various interior aircraft features with respect to one another and with respect to the fuselage walls.

Aircraft flexure typically establishes gaps between elements on the aircraft. The gaps may be temporary, semi-permanent, or permanent depending upon the nature of the flexure. This gapping occurs, for instance, between wall panels or ceiling panels and bulkhead walls. Gapping can also occur between other aircraft features including interior elements and features.

Aircraft building tolerances also require significant production time where installers have to cut and fit each component feature keeping in mind ordinary aircraft flexure. Aircraft build tolerances are also impacted by individual component manufacturing tolerances, build sequence installation, jig positioning, manual installation and aircraft structure build tolerances. The sum of these tolerances may create gaps that are independent of aircraft flexure.

When aircraft flexure occurs, the gaps introduced thereby creates a drawback in the aesthetic appearance of the cabin features. Specifically, customers prefer not to see gaps or other inconsistencies between interior design details. In other words, customers prefer to see a high quality finish in the interior of an aircraft regardless of the aircraft flexure conditions.

SUMMARY

Accordingly, it is an object of the present invention to overcome the existing drawbacks with respect to gapping between interior aircraft features as result of aircraft flexure, manufacturing tolerances and build sequence. As will be discussed herein, the present invention establishes buffer zones at intersections between aircraft features to minimize or eliminate gaps between those features that may otherwise appear.

It is, therefore, an aspect of the present invention to provide an aircraft interior panel configuration that includes a first interior panel having a first edge, a first cavity formed in the first edge, a first soft seal element disposed in the first cavity, and a transition insert disposed adjacent to the first edge such that the first edge overlaps the transition insert. The transition insert is adapted to be fixedly mounted in an aircraft interior along an arc. The first soft seal element is biased to press the first edge against a surface of the transition insert.

It is contemplated for the aircraft interior panel configuration that the first edge is configured to slide against the surface of the bulkhead transition surface while being pressed thereagainst.

It is also contemplated that the transition insert is a bulkhead transition insert extends between a first and a second bulkhead.

In one contemplated embodiment, the first edge is a flexible material.

In another contemplated embodiment, the first soft seal element is a flexible material.

The aircraft interior panel configuration also may include a second interior panel having a second edge, a second cavity formed in the second edge, and a second soft seal element formed in the second cavity. If so, it is contemplated that the second edge overlaps the transition insert and is disposed from the first edge, thereby establishing a gap between the first edge and the second edge. Moreover, the second soft seal element may be biased to press the second edge against the surface of the transition insert.

In this contemplated embodiment, the second edge may be configured to slide against the surface of the bulkhead transition surface while being pressed thereagainst.

In one contemplated embodiment, the transition insert is a bulkhead transition insert extends between a first and a second bulkhead.

It is contemplated that the second edge may be a flexible material. Similarly, the second soft seal element may be a flexible material.

In a further embodiment, the present invention provides for an aircraft interior panel configuration that includes a first interior panel having a first edge, a first soft seal element disposed at the first edge, and a transition insert disposed adjacent to the first edge such that the first edge overlaps the transition insert. The transition insert is adapted to be fixedly mounted in an aircraft interior along an arc. The first soft seal element is biased to press the first edge against a surface of the transition insert.

In still another contemplated embodiment, the aircraft interior panel configuration also may include a second interior panel having a second edge, and a second soft seal element disposed at the second edge. If so, the second edge is contemplated to overlap the transition insert and is disposed from the first edge, thereby establishing a gap between the first edge and the second edge. The second soft seal element is contemplated to be biased to press the second edge against the surface of the transition insert.

In still another embodiment, the present invention provides an aircraft interior wall panel configuration that includes a sidewall having an edge, a cavity formed in the edge, and a soft seal element disposed in the cavity. The sidewall is adapted to be mounted as a wall inside an aircraft. The flexible edge is biased into a pressing engagement with a bulkhead.

In this embodiment, it is contemplated that the edge may be made from a flexible material. Similarly, the soft seal element may be made from a flexible material.

In a further embodiment, the present invention provides an aircraft interior wall panel that has a sidewall having an edge and a soft seal element disposed at the edge. The sidewall is adapted to be mounted as a wall inside an aircraft. The flexible edge is biased into a pressing engagement with a bulkhead.

It is contemplated that a first bulkhead surface may be attachable to a frame, disposable adjacent to a first side ledge and that a first soft seal element may connect the first bulkhead surface to a first side of the frame. The first bulkhead surface may be biased into pressing engagement with the first side ledge by the first soft seal element.

It is further contemplated that the adjustable width aircraft bulkhead may include a second bulkhead surface attached to a second side of the frame, disposable adjacent to second side ledge and a second soft seal element connecting the second bulkhead surface to a second side of the frame. The second bulkhead surface may be biased into pressing engagement with the second side ledge by the second soft seal element.

In this contemplated embodiment, the frame may be attachable to the fuselage of the aircraft. Furthermore, the first soft seal element may be made from a flexible material and the second soft seal element also may be made from a flexible material.

In yet another contemplated embodiment, the present invention provides for an aircraft personal service unit configuration that includes a personal service unit, an end defined by the personal service unit, and a transition end cap disposed on a bulkhead comprising a protrusion with an end. The protrusion may extend behind the personal service unit, the soft seal element may bias the end against the personal service unit, and the protrusion and the personal service unit may be in sliding engagement with one another.

With respect to the aircraft personal service unit, it is contemplated that a soft seal element may be disposed at the end of the protrusion, biasing the end of the protrusion against the personal service unit. As before, the soft seal element is contemplated to be a flexible material.

Those skilled in the art will appreciate other aspects of the invention based on the discussion that follows and the drawings appended hereto.

BRIEF DESCRIPTION OF THE DRAWINGS

One or more embodiments of the present invention will now be described in connection with the figures appended hereto, in which.

DETAILED DESCRIPTION

The description of the invention set forth below focuses on one or more examples of the invention. These examples are intended to be exemplary of the invention and not limiting of the scope of the invention. As should be apparent to those skilled in the art, the examples described herein present aspects of the invention for which there are numerous variations and equivalents. Those variations and equivalents are intended to be encompassed by the present invention.

The various figures presented herein are contemplated to be employed in connection with an aircraft typically referred to as a business aircraft or a personal aircraft. Business and personal aircraft share many features with commercial aircraft, except that business and private aircraft tend to be more modest in size and offer a different interior configuration for the passengers. While aspects of the present invention are intended to be employed in connection with a business aircraft or a private aircraft, it is noted that one or more aspects of the present invention may be employed on a commercial aircraft. Separately, it is contemplated that one or more aspects of the present invention may be employed on other vehicles, including recreational vehicles, boats, trains, etc., without departing from the scope of the present invention.

Figure 1:
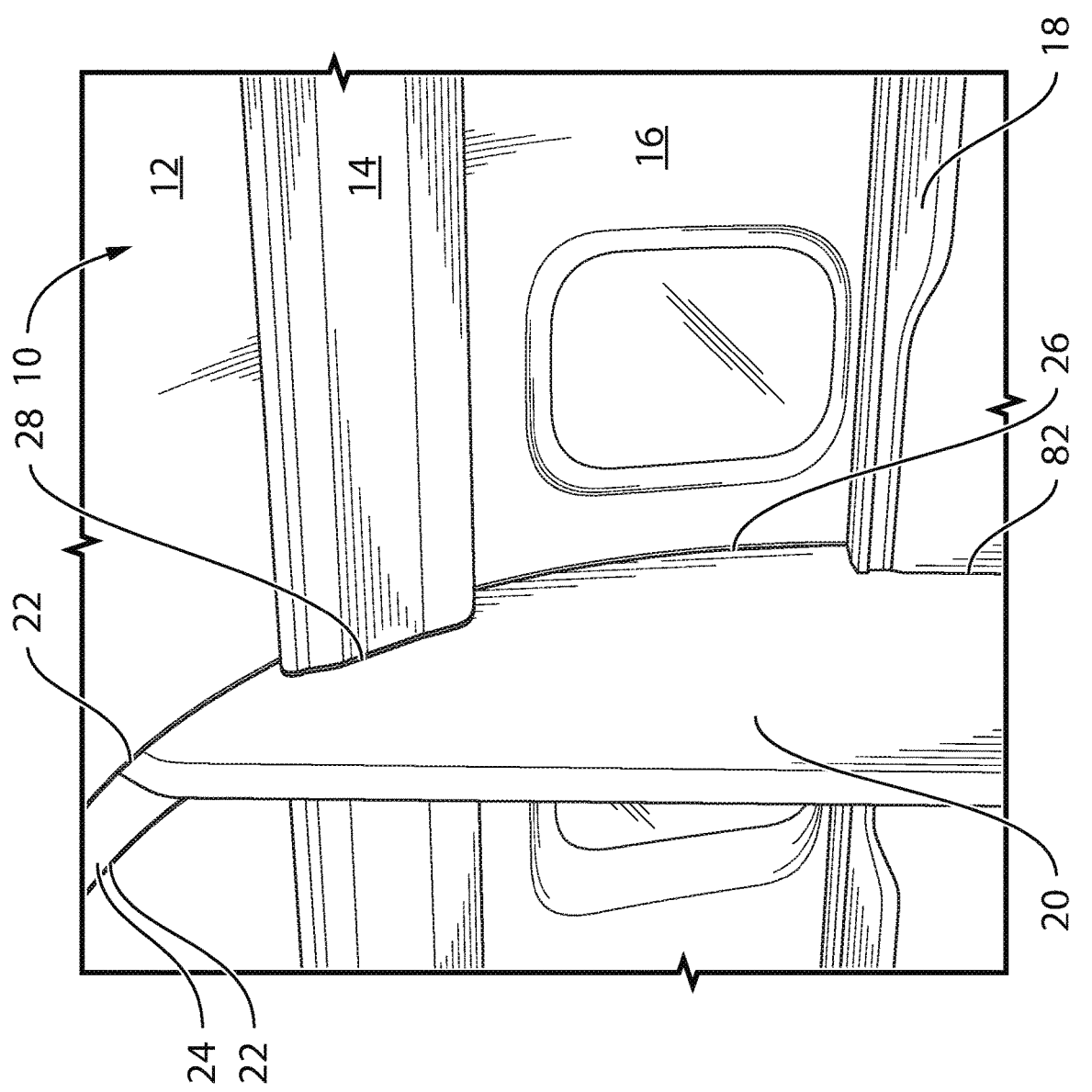
FIG. 1 is a perspective view of a section of an interior of an aircraft showing multiple interior aircraft features and intersections.

Turning first to FIG. 1, there is shown an interior section 10 of an aircraft. The interior section 10 includes ceiling panels 12, personal service units 14, sidewalls 16, a side ledge 18, and a bulkhead 20. It is readily apparent from FIG. 1 that there are multiple locations where there may be gaps or spaces between various ones of the interior features, primarily along the longitudinal length of the aircraft.

As illustrated in FIG. 1, two gaps 22 may be established between a bulkhead transition insert 24 and adjacent ceiling panels 12. In addition, a gap 26 may be established between the sidewall 16 and the bulkhead 20. Still further, a gap 28 may be established between the personal service unit 14 and the bulkhead 20. Another gap 82 may be established between a side ledge 18 and the bulkhead 20. Each of these gaps 22, 24, 28, 82 establish locations where the fit and finish of the interior of the aircraft may be diminished during the dynamic conditions associated with aircraft flexure. In particular, during instances of aircraft flexure, among other reasons, the gaps 22, 24, 28, 82 may increase in size, change shape, or otherwise negatively impact the appearance of the interior the aircraft. The present invention provides for several embodiments of buffer zones that are contemplated to reduce or eliminate the unsightly appearance of the gaps 22, 24, 28, 82, regardless of the static or dynamic conditions in the aircraft.

Turning now to FIG. 2 there is shown again an interior section 10 of an aircraft. A close-up view of the first buffer zone 30 according to the present invention is provided in the enlarged detail included in the drawing. As shown, the buffer zone 30 is associated with the bulkhead transition insert 24 and the adjacent ceiling panels 12.

The bulkhead transition insert 24 extends along a circumferential arc within the interior of the aircraft between two bulkhead walls 20. The bulkhead transition insert 24 abuts against two soft seal elements 32 on opposite sides thereof. The soft seal elements 32 are positioned within cavities 34 established within the edges 36 of the ceiling panels 12. As illustrated, a gap 38 exists between the edges 36. The gap 38 has a width 40. The gap 38 exposes the surface of the bulkhead transition insert 24 so that the bulkhead transition insert 24 is made visible to persons within the interior section 10 of the aircraft.

Figure 2:
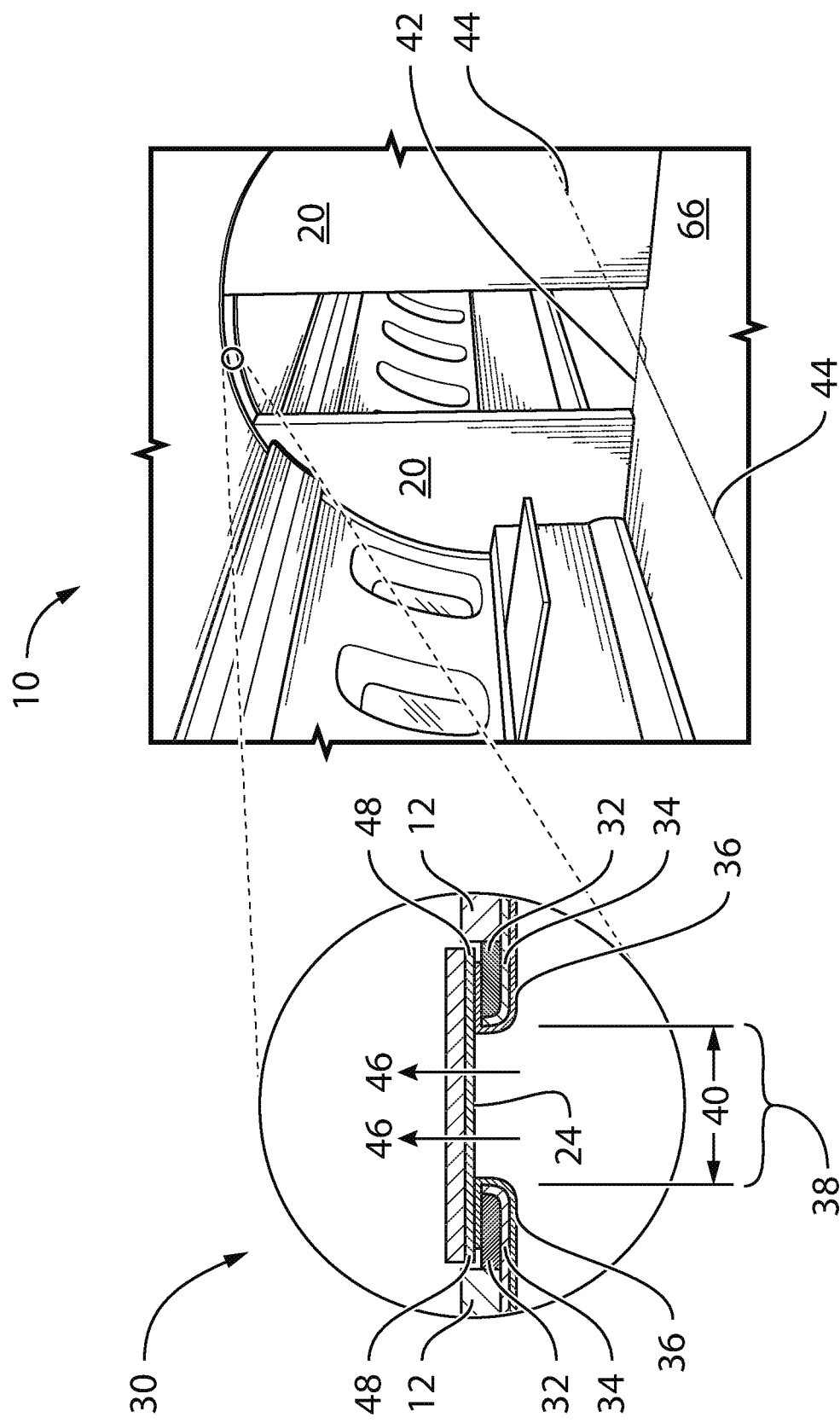
FIG. 2 is a perspective view of an interior of an aircraft having a blow up feature highlighting a bulkhead transition insert, showing a first buffer zone according to the present invention.

As made apparent in FIG. 2, the edges 36 of the adjacent ceiling panels 12 extend across the width of the aircraft, along a lateral axis 42 perpendicular to a longitudinal axis 44 of the aircraft. The edges 36 form transitions along the entire length of the intersection between the ceiling panels 12 and the bulkhead transition insert 24.

The edges 36 are made of a flexible material. The edges 36 may be greater than one inch wide, or alternatively greater than two inches in width, as required or as desired. The edges 36 are allowed to freely move in relation to the bulkhead transition insert 24. The flexible material that makes up the edges 36 may be an elastomeric material such as a rubber or polyurethane foam that is able to be compressed and spring back to its regular length during the ordinary compression and expansion of the aircraft fuselage during service. The soft seal elements 32 that are disposed within the edges 36 also are contemplated to be made of a flexible material.

With continued reference to FIG. 2, it is noted that the edges 36 are contemplated to be fashioned as hollow structures, defining the cavities 34 that house the soft seal elements 32. The edges 36 and soft seal elements 32 are contemplated to be biased against the bulkhead transition insert 24 in the direction of the arrows 46. With this construction, the edges 36 are biased to remain in constant contact with the surface of the bulkhead transition insert 24 regardless of the width 40 of the gap 38 between the edges 36.

The soft seal elements 32 are contemplated to provide the primary biasing force for the edges 36 of the ceiling panels 12, pressing the edges 36 against the surface of the bulkhead transition insert 24. Due to the bias against the bulkhead transition insert 24 by the soft seal elements 32, the interior surfaces 48 of the edges 36 are pressed against the bulkhead transition insert 24. The interior surfaces 48, biased by the soft seal elements 32, slide across the surface bulkhead transition insert 24 as the ceiling panels 12 move with respect to one another during instances of aircraft flexure. As the edges 36 of the ceiling panels 12 move with respect to one another during aircraft flexure, the width 40 of the gap 38 changes in dimension.

As should be apparent from the foregoing, the soft seal elements 32, in cooperation with the flexible edges 36 of the ceiling panels 12, establish a first embodiment of the buffer zone 30 according to the present invention. In particular, the buffer zone 30 provides a gap-free transition between the ceiling panels 12 and the bulkhead transition insert 24. With the buffer zone 30, the creation of any gaps 22 between the edges 36 of the ceiling panels 12 and the bulkhead transition insert 24 is avoided or at least greatly reduced. As a result, the aesthetic appearance of the interior section 10 of the aircraft is improved regardless of the flexure condition of the aircraft.

Figure 3:
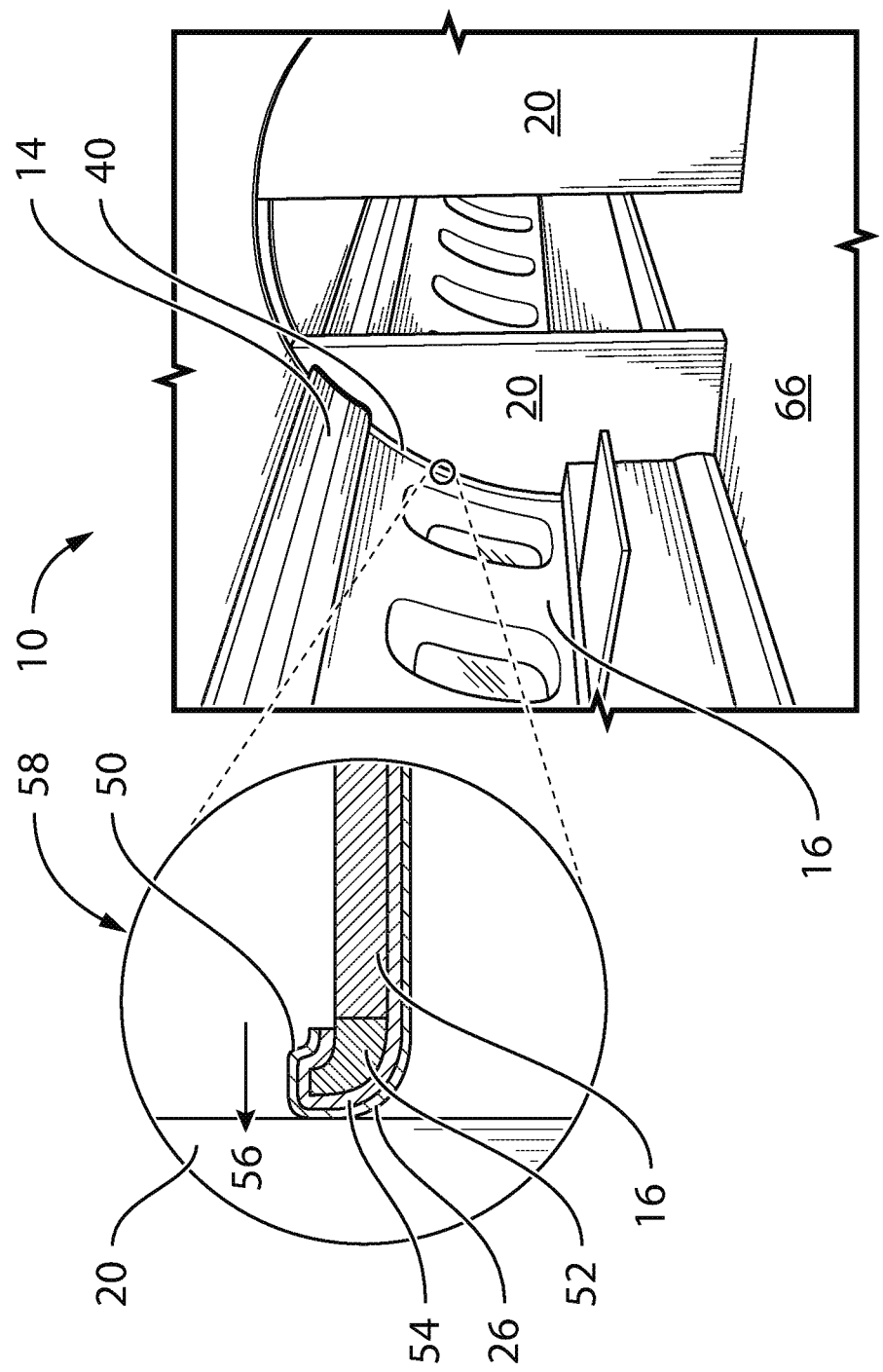
FIG. 3 is another perspective view of an aircraft interior highlighting a soft seal intersection between a sidewall or headwall and a bulkhead, showing a second buffer zone according to the present invention.

FIG. 3 again shows the interior section 10 of an aircraft. In this view, an enlarged section of the sidewall 16 is shown. The sidewall 16 includes an edge 50 with a soft seal element 52 disposed therein. As in the embodiment of the buffer zone 30, the edge 50 is flexible. The edge 50 establishes a cavity 54 that houses the soft seal element 52. The soft seal element 52 is biased in the direction of the arrow 56. The edge 52 flexibly engages at the gap 26 forming the intersection between the sidewall 16 and the bulkhead 20. The flexible edge 52 creates a soft seal between the sidewall 16 and the bulkhead 20. The flexible edge 52 is made of a resilient material that may be compressed and bounce back to full length depending on the compression and expansion of the fuselage and the sidewall 16 relative to the bulkhead 20. The edge 52 may be at least one inch in width, or alternatively at least two inches in width, as required or as desired. The material forming the flexible edge 52 may be an elastomeric compound, a polyurethane foam, or other resilient polymer that is able to be compressed and then re-expanded during service. The soft seal element 52 also is contemplated to be made of a similar flexible material.

As should be apparent from the foregoing, the soft seal element 52, in cooperation with the flexible edge 50 of the sidewall 16, establish a second embodiment of a buffer zone 58 according to the present invention. In particular, the buffer zone 58 provides a gap-free transition (or substantially gap-free transition) between the sidewall 16 and the bulkhead 20. With the buffer zone 58, the creation of any gaps 26 between the edge 50 of the sidewall 16 and the bulkhead 20 is avoided or at least greatly reduced. As a result, the aesthetic appearance of the interior section 10 of the aircraft is improved regardless of the flexure condition of the aircraft.

Figure 4:
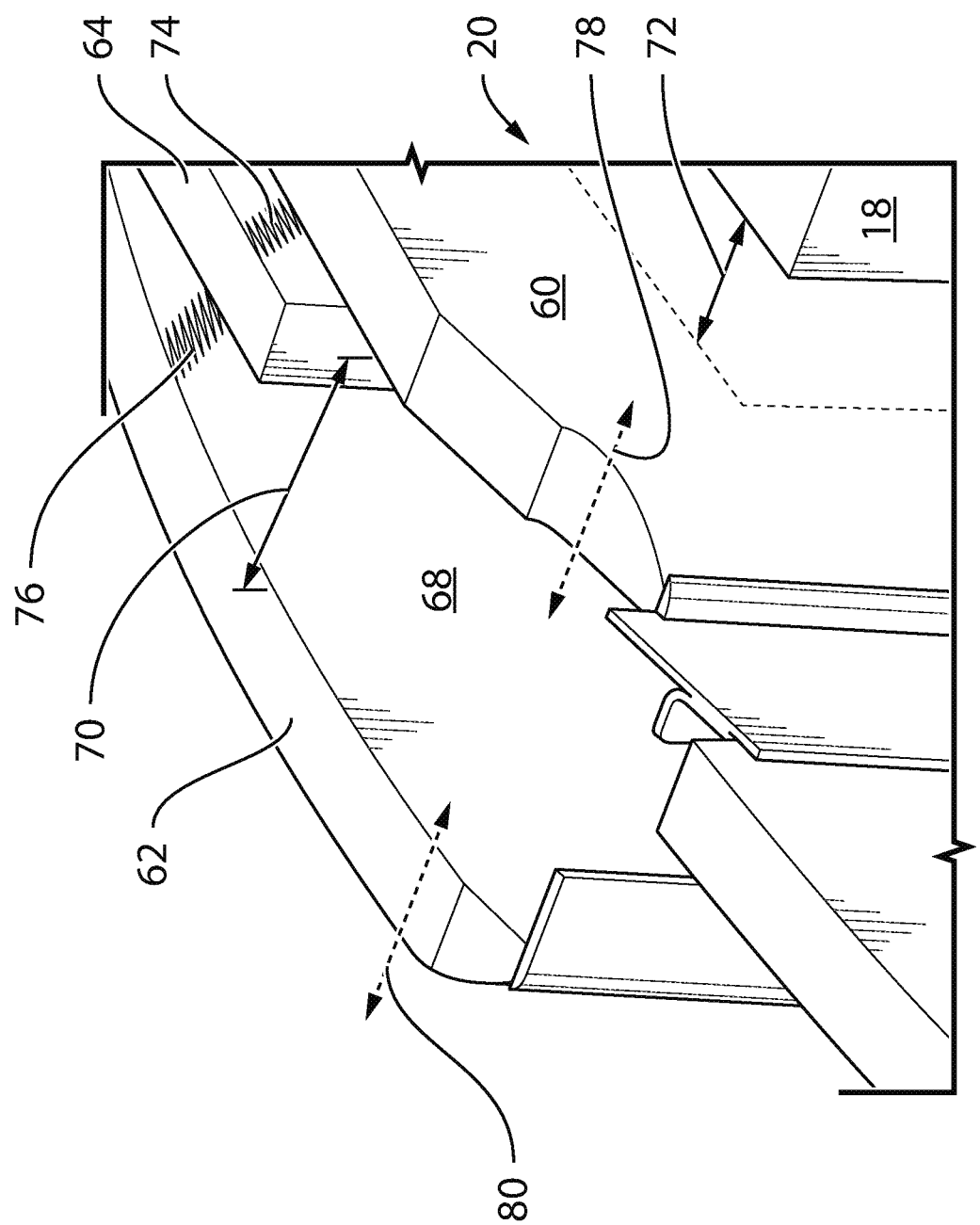
FIG. 4 is a perspective view of an adjustable-width bulkhead, showing a third buffer zone according to the present invention.

FIG. 4 is a close up view of the bulkhead 20 that includes bulkhead surfaces 60, 62. The bulkhead surfaces 60, 62 are secured to an internal cage frame 64 that is anchored to the interior of the aircraft. It is contemplated that the cage frame 64 is secured to the floor 66 of the aircraft.

As illustrated in FIG. 4, a gap 68 is established between the bulkhead surfaces 60, 62. The cage frame 64 is disposed in the gap 68. The width 70 of the gap 68 is variable to accommodate the dynamic conditions associated with aircraft flexure.

FIG. 4 illustrates a third embodiment of a buffer zone 72 between the bulkhead surfaces 60, 62. The buffer zone 72 permits the bulkhead surfaces 60, 62 to move in relation to one another on opposite sides of the cage frame 64. To permit the bulkhead surfaces 60, 62 to move relative to one another and the cage frame 64, the bulkhead surfaces 60, 62 are attached to the cage frame 64 via soft seal elements 74, 76. As in prior embodiments of the buffer zone 30, 58, the soft seal elements 74, 76 may be made from a flexible material such as foam, rubber, or any other type of elastomeric material.

As illustrated in FIG. 4, the bulkhead surface 60 is permitted to move in the direction of the arrows 78. Similarly, the bulkhead surface 62 is permitted to move in the direction of the arrows 80. The soft seal elements 74, 76 flex during moments of aircraft flexure to permit the movement of the bulkhead surfaces 60, 62 in relation to the cage frame 64.

The soft seal elements 74, 76 may be varied in size so that the bulkhead surfaces 60, 62 may be positioned immediately adjacent to the adjacent side ledges 18. In this fashion, the buffer zone 72 eliminates or at least minimize the formation of any gaps 82 between the side ledges 18 and the bulkhead 20, specifically the bulkhead surfaces 60, 62.

As should be apparent from the foregoing, the soft seal elements 74, 76, in cooperation with the bulkhead surfaces 60, 62 and the side ledges 18, establish the third embodiment of the buffer zone 72 according to the present invention. In particular, the buffer zone 72 provides a gap-free transition between the side ledges 18 and the bulkhead surfaces 60, 62 of the bulkhead 20. With the buffer zone 72, the creation of any gaps 82 between the side ledges 18 and the bulkhead 20 are avoided or at least greatly reduced. As a result, the aesthetic appearance of the interior section 10 of the aircraft is improved regardless of the flexure condition of the aircraft.

In connection with the embodiment of the buffer zone 72, it is noted that the side ledges 18 and the cage frame 64 are fixedly mounted within the aircraft. In particular, the cage frame 64 and the side ledges 18 are two of the features within the aircraft are the features around which other elements in the aircraft are designed. For this reason, the buffer zone 72 cooperates with the buffer zone 58 to minimize or eliminate gaps 82 that may form during dynamic the conditions associated with aircraft flexure.

FIGS. 5-8 illustrate aspects of a fourth embodiment of a buffer zone 84 according to the present invention. Here, the buffer zone 84 is established between ends 86 of the personal service units 14 and the bulkhead 20, specifically the bulkhead surfaces 60, 62.

Figure 5:
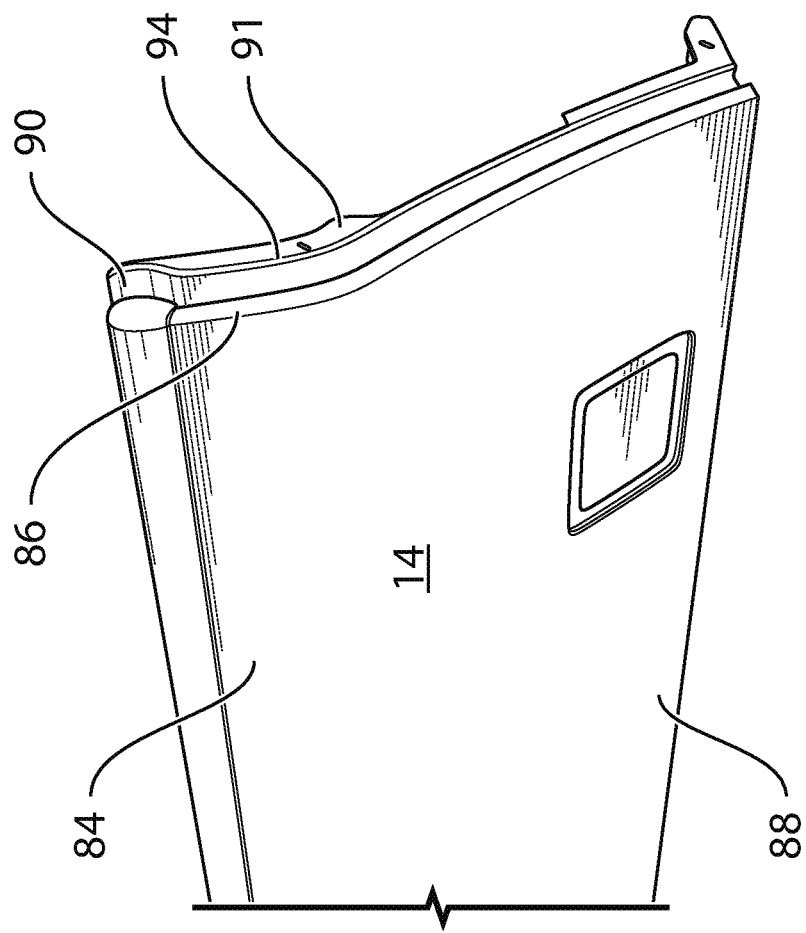
FIG. 5 is a perspective view of an end of a personal services service unit, showing a fourth embodiment of a buffer zone according to the present invention.

As illustrated in FIG. 5, the personal service unit 14 has a longitudinal end 86. The personal service unit 14 includes a front face 88 that runs longitudinally along the wall of a fuselage. At the longitudinal end 86 of the personal service unit 14, there is shown a transition end cap 90. The transition end cap 90 is essentially an L-shaped bracket that is attached, at an attachment end 91, to the bulkhead 20. A protrusion 92 protrudes from the attachment end 91 of the transition end cap 90 and extends behind the end 86 of the personal service unit 14.

Figure 6:
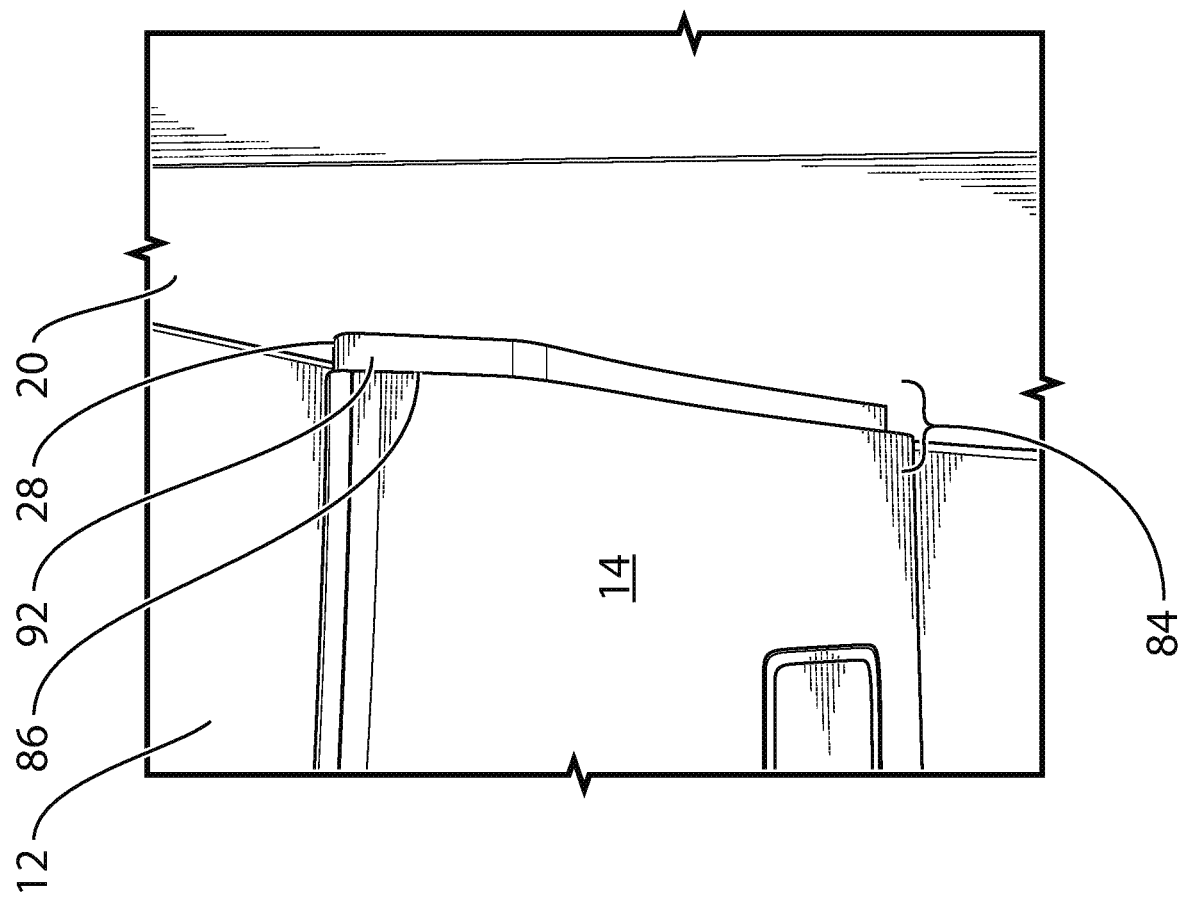
FIG. 6 is a perspective view of an end of the personal service unit show in in FIG. 5, in an orientation where the personal service unit is mounted against a bulkhead wall.
Figure 7:
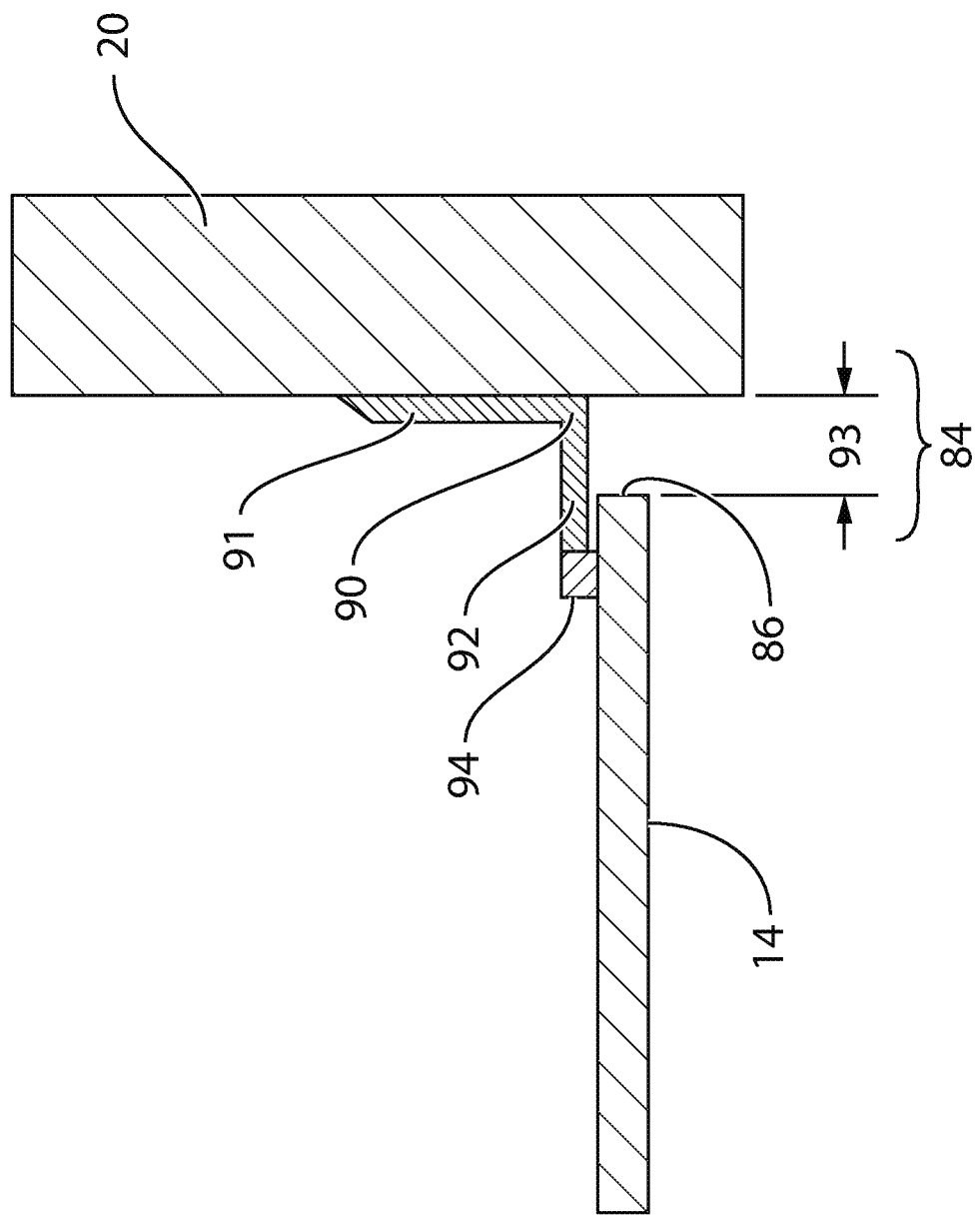
FIG. 7 is a graphical illustration of the fourth embodiment of the buffer zone according to the present invention.

As made apparent by FIGS. 5, 6, and 7, during instances of aircraft flexure, the end 86 of the personal service unit 14 slides adjacent to the protrusion 92 during instances of aircraft flexure. In this fashion, as the distance 93 between the end 86 of the personal service unit 14 and the bulkhead 20 changes during aircraft flexure, the amount of the protrusion 92 that is visible between the end 86 of the personal service unit 14 and the bulkhead 20 changes. While this distance 93 changes, no visible gaps 28 are created because the protrusion 92 presents a sufficient length behind the end 86 of the personal service unit 14 that the surface of the protrusion 92 remains visible to passengers in the aircraft. As such, while the distance 93 changes, the passengers are unlikely to perceive the changes when the aircraft is subjected to dynamic conditions resulting in aircraft flexure. In one contemplated embodiment, the protrusion 92 may be provided with a soft seal element 94 that is positioned between the protrusion 92 and the rear surface of the personal service unit 14.

As should be apparent from the foregoing, cooperation between the protrusion 92 on the transition end cap 90 attached to the bulkhead 20 and the end 86 of the personal service unit 14 establishes the fourth embodiment of the buffer zone 84 according to the present invention. In particular, the buffer zone 84 provides a gap-free transition between the end 86 of the personal service unit 14 and the protrusion 92 on the transition end cap 90 attached to the bulkhead 20. With the buffer zone 84, the appearance of any gaps 26 between the bulkhead 20 and the personal service unit 14 are avoided or at least greatly reduced. As a result, the aesthetic appearance of the interior section 10 of the aircraft is improved regardless of the flexure condition of the aircraft.

In connection with the fourth embodiment of the buffer zone 84, it is noted that the construction offers an additional advantage in that the end 86 of the personal service unit 14 may abut against the bulkhead 20. Since the personal service unit 14 typically covers light strips, such as strips of light emitting diodes, the light strips may extend to a position near to the end 86 of the personal service unit 14. As a result of this construction, the lighting strips may extend to a location very near to the bulkhead 20. This further improves the aesthetic appearance of the interior of the aircraft.

FIG. 7 is a graphical illustration that shows the relative positioning of the personal service unit 14, the transition end cap 90, and the bulkhead 20. The soft seal element 94 is shown. The soft seal element 94 is illustrated as being incorporated into the end of the protrusion 92, consistent with other embodiments of the present invention as discussed above. In an alternative embodiment, the soft seal element 94 may be attached to the end of the protrusion 92. As with other embodiments, it is contemplated that the soft seal element 94 biases the end of the protrusion 92 into contact with the end 86 of the personal service unit 14.

Figure 8:
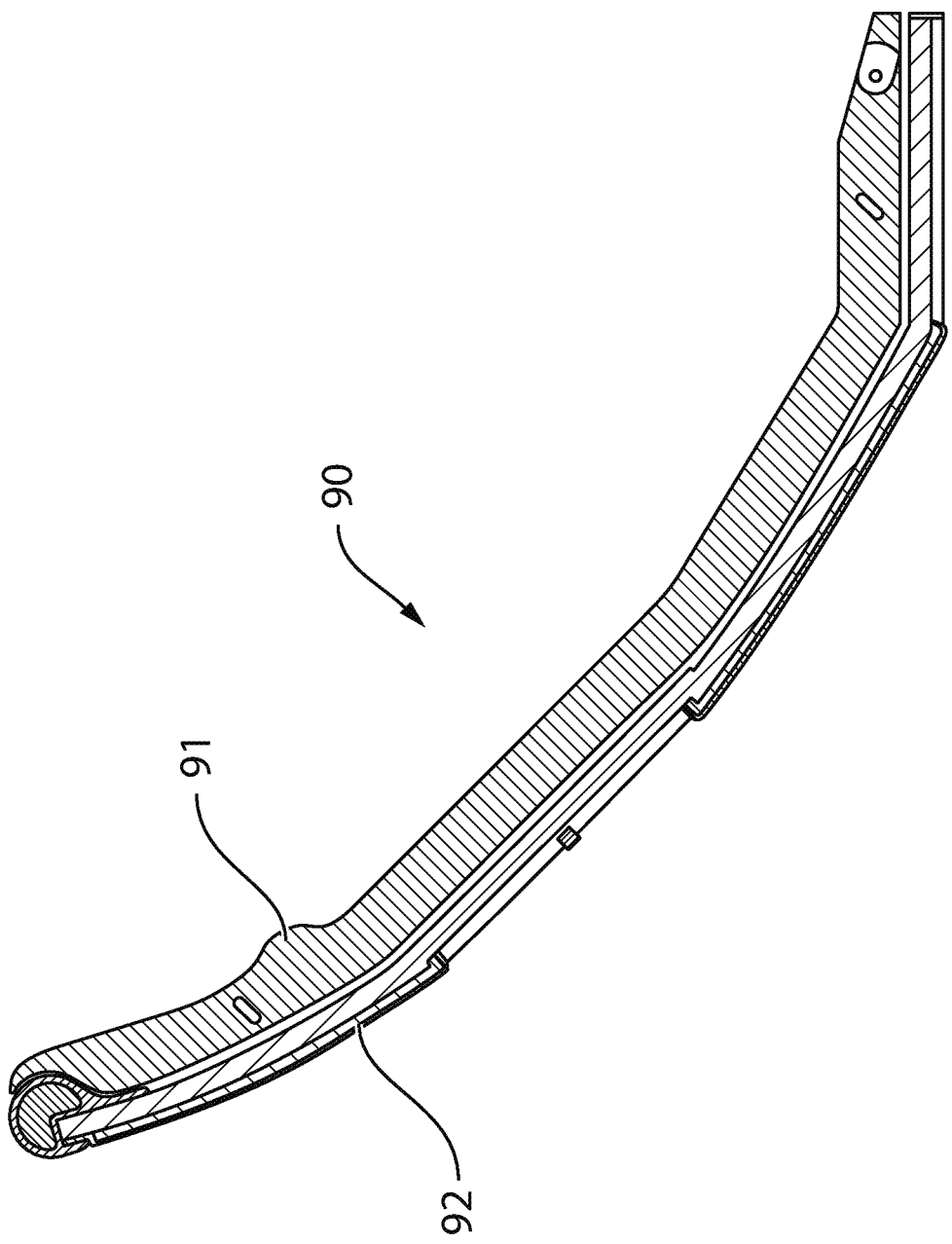
FIG. 8 is an end view of a transition end cap forming a part of the fourth embodiment of the buffer zone according to the present invention.

FIG. 8 is an end view of the transition end cap 90 that is attached to the bulkhead 20. As is apparent, the transition end cap 90 is contemplated to be shaped such that it is complimentary to the shape of the personal service unit 14.

Within the present specification, there may be explicit or implicit references to aspects of safety. It is noted that any comments or implications with respect to safety are merely for purposes of the present discussion. As should be apparent to those skilled in the art, any furniture and/or components that are incorporated in the interior space of an aircraft are subject to various federal regulations worldwide. As a result, any suggestion, whether explicit or otherwise, should not be taken as an indication that any component of an aircraft, whether currently produced or not, is more or less safe than any other component.

As indicated above, the present invention is not intended to be limited solely to the examples described and/or illustrated herein. To the contrary, there are numerous variations and equivalents that should be apparent to those skilled in the art based upon the examples described and/or illustrated herein. Those variations and equivalents are intended to be encompassed by the present invention.

What is claimed is:

1. An aircraft interior panel configuration between adjacent panels, comprising:
    a first panel of the adjacent panels having a first extremity and a first edge extending beyond said first extremity;
    a first cavity formed in the first edge;
    a second panel of the adjacent panels having a second extremity and a second edge extending beyond said second extremity;
    a second cavity formed in the second edge;
    a first seal element disposed in the first cavity extending from said first extremity from the first panel towards the second panel;
    a second seal element disposed in the second cavity extending from said second extremity from the second panel towards the first panel; and
    a transition insert extending between the adjacent panels;
    wherein:
        the first and second seal elements are biased to press the first edge of the first panel and the second edge of the second panel respectively against the transition insert, such that the first edge and the second edge are biased to remain in constant contact with a surface of the transition insert regardless of a width of a first gap between said first and second edges of the adjacent panels;

the first edge and the second edge slide across the transition insert as the adjacent panels move with respect to one another; and the transition insert is sized to completely fit in a second gap defined between said first and second extremities of said adjacent panels, behind the first edge and the second edge.

2. The aircraft interior panel configuration of claim 1, wherein the adjacent panels are one of an interior ceiling panel and an interior wall panel.

3. The aircraft interior panel configuration of claim 2, wherein the transition insert is a bulkhead transition insert that extends between a first and a second bulkhead.

4. The aircraft interior panel configuration of claim 1, wherein the first edge comprises a flexible material.

5. The aircraft interior panel configuration of claim 1, wherein the first seal element comprises a flexible material.

* * * * *